Oct. 20, 1925.  1,557,591
C. H. JOCKMUS
STRUT ROD
Filed Dec. 22, 1922
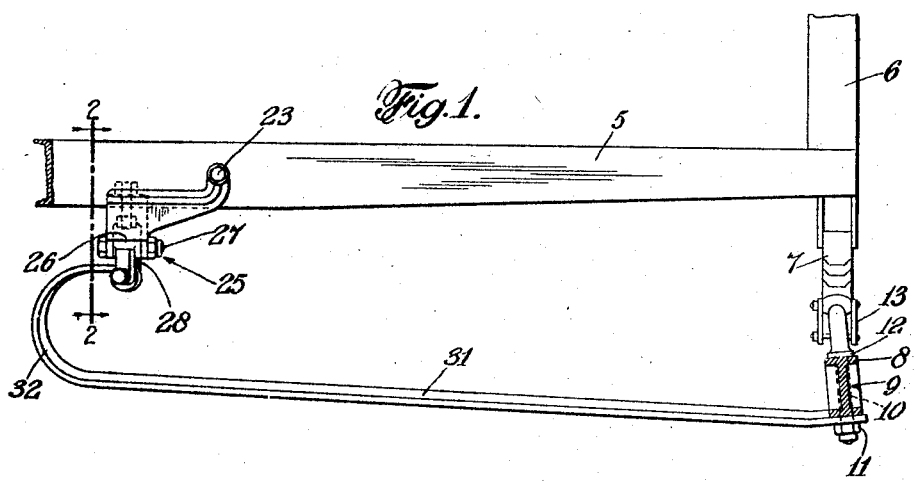
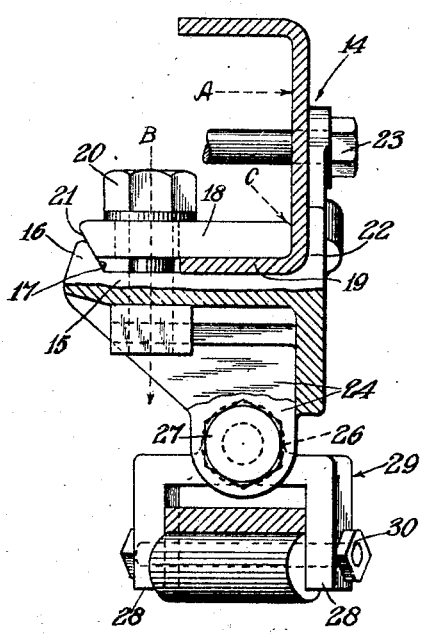
Charles H. Jockmus, Inventor
By his Attorneys
Williams & Pritchard Patented Oct. 20, 1925.

1,557,591

UNITED STATES PATENT OFFICE.

CHARLES H. JOCKMUS, OF ANSONIA, CONNECTICUT.

STRUT ROD.

Application filed December 22, 1922. Serial No. 608,511.

*To all whom it may concern:*

Be it known that I, CHARLES H. JOCKMUS, a citizen of the United States, residing in Ansonia, county of New Haven, and State of Connecticut, have invented certain new and useful Improvements in Strut Rods, of which the following is a specification.

This invention relates to strut rods and is adapted for use in connection with the chassis construction of automobiles in general, although designed to function, primarily, in connection with automobiles of the Ford type, as a means to strengthen or reinforce particularly the front axles thereof against undue lateral or torsional strains.

An important object of my invention is to provide in a device of the character mentioned, a means whereby the device as a whole may be relieved of any undue strain or stresses which would otherwise be transmitted thereto as the result of the vibratory or other relative movement between the axle and the automobile frame.

Other objects and certain advantages of the invention will become apparent from the following description when taken in connection with the accompanying drawings in which, Figure 1 is a side elevation of a portion of an automobile chassis showing the device embodying my invention attached thereto.

Figure 2 is a transverse sectional view taken on line 2—2 of Figure 1.

In the drawings, wherein for the purposes of illustration, is shown what I at present consider the preferred form of my invention, the numeral 5 indicates one of the two side members of an automobile frame adapted to support at its forward end the usual radiator 6 and front spring construction 7 to which the front axle 8 is suitably connected, as by means of spring perches, one of which is indicated by the numeral 9. Each of these spring perches comprises an elongated stem 10 passed through the axle and provided at its lower end with a nut 11 which functions cooperatively with the shoulder 12 as a means for rigidly retaining the perch in proper position with respect to the axle. In connecting the perch to the spring 7, the usual form of shackle 13 is employed which permits a relative movement between the end of the spring 7 and the axle 10 without transmitting undue strains or stresses.

The device embodying my invention is particularly adapted to be used in connection with the standard construction employed in automobiles of the Ford type and above described, but it will be understood that the same may be applied to other types of automobiles without departing from the spirit of the invention.

In the embodiment of my invention, the numeral 14 indicates, as a whole, one of the two brackets adapted to be connected, respectively, to the side members 5 each of which brackets comprises an anchor plate 15 having formed integral therewith a rib or flange 16, the inner surface of which is beveled to provide a cam face 17. This cam face is adapted to cooperate with a clamp plate 18 adapted to engage the lower flange 19 of the side frame 5, it being maintained in intimate engagement therewith by means of a bolt 20 extending through the plate 15. The clamp plate 18 at one side thereof is beveled in order to provide a cam face 21 adapted to engage and cooperate with the cam face 17 as a means for urging the opposite end of the plate 18 into intimate engagement with the side member 5 thus clamping the same in a rigid position intermediate the plate 18 and a longitudinally disposed arm 22 which is formed integral with the plate 15 and functions cooperatively with a bolt 23 passed transversely therethrough as a means for locating the proper clamping position of the bracket 14. It is obvious that, by reason of the cooperation of the plate 18 with the rib or flange 16, when the bolt 20 is tightened the component forces exerted upon the side member 5 are in the directions of the arrows A and B and that a resultant force is exerted in the general direction indicated by the arrow C. By reason of the fact that these forces are exerted as described, it is obvious that an intimate clamping engagement is effected between the side member 5 and the plate 15 and that this engagement is effectively maintained under all reasonable conditions to which the device might be subjected.

To the plate 15 there is connected a pair of depending arms 24 which are spaced apart a sufficient distance to receive therebetween a shackle indicated as a whole by the numeral 25. This shackle comprises a longitudinally disposed bearing 26 disposed intermediate the arms 24 and retained in position therebetween by means of a bolt 27 upon which the shackle in its entirety is permitted to move slightly with respect to the arms 24. To the bearing 26 there is connected a pair of depending arms 28 which when taken collectively form a suspended yoke 29. Between the arms 28 is pivotally connected as by means of a bolt 30, the rear end of a more or less resilient strut rod 31, which at its forward end, is rigidly connected to the axle 8 by means of the stem 10 and nut carried thereby. In construction the strut rod 31, the rear end is bent into an arcuate shape, as shown at 32, and thus a more or less resilient or spring like connection is afforded between the shackle 25 and the axle 8 by reason of which the axle 8 is permitted, when a shock is encountered, to move laterally with respect to the automobile frame without imparting to the shackle or any of its associated elements, an undue strain or thrust. It will be appreciated, too, that when the strut rod 31 is connected to the arms 24 through the intervening shackle 25 either end of the axle 8 may be raised or lowered with respect to the other end without transmitting to the arms 24 or setting up within the strut rod 31 any undue strain since the shackle 25 is permitted to swing or oscillate in a plane passed transversely through the automobile frame. Furthermore, by reason of the fact that the strut rod 31 is pivotally connected to the shackle 28 by means of the bolt 30, it is obvious that when a relative movement between the axle 8 and the automobile frame occurs, the strut rod is permitted to move about its pivotal connection with the shackle 25 without setting up within the shackle or the strut rod itself any excessive or undue strains. By the elimination of such strains and stresses as would occur in the absence of the shackle, it is obvious that danger of breakage of the strut rod or any of the several elements associated therewith is eliminated, and at the same time the risk or hazard incident to the driving of automobiles is materially reduced.

Having thus described my invention, I claim:

1. The combination of an automobile frame employing side members and having an axle associated therewith, of a strut rod connected to said axle, means for connecting said strut rod to the frame, said means comprising a bracket adapted to be fitted to the side member of the frame and a shackle disposed intermediate said bracket and said strut rod, said shackle being connected to the strut rod and pivoted to said bracket longitudinally of said frame whereby the point of connection between the strut rod and shackle is adapted to move only in a vertical plane passed transversely through said frame.

2. The combination with an automobile frame employing side members and having an axle associated therewith, of a strut rod connected to said axle, a bracket connected to the side members of said frame and means for connecting said strut rod to said bracket, said means being in the form of a shackle pivoted to said bracket longitudinally of said frame, and pivoted to said strut rod transversely of said frame whereby the pivotal point of connection between said bracket and strut rod is adapted to move only in a vertical plane passed transversely through said frame and the pivoted end of the strut rod is adapted to move freely about its point of connection with said shackle.

3. The combination with an automobile frame employing side members and having an axle associated therewith, of a strut rod connected to said axle, a bracket connected to said frame, a movable element connected to said bracket and adapted to swing only in a vertical plane passed transversely through said frame, and means for pivotally connecting said strut rod to said movable element.

4. The combination with an automobile frame employing side members and having an axle associated therewith, of a strut rod connected to said axle said strut rod being at its rear end bent into an arcuate shape, a bracket carried by said frame, a movable connecting element pivotally connected to said bracket longitudinally of said frame and adapted to swing only in a vertical plane passed transversely through said frame, and means for pivotally connecting the arcuate shape end of said strut rod to said connecting element transversely of said frame whereby the forward end of said strut rod is adapted to freely move in an arc about the pivotal connection of said strut rod, the point of pivotal connection of said strut rod with said connecting element being adapted, by reason of the longitudinal pivotal connection between said connecting element and bracket, to move only in a vertical plane passed transversely through said frame.

5. The combination with an automobile frame employing side members and having an axle associated therewith, of a strut rod rigidly connected to said axle, a bracket rigidly connected to said frame, a clamp plate for maintaining said bracket in intimate engagement with said frame, a connecting member pivotally connected to said bracket longitudinally of said frame, and means for pivotally connecting the rear end of said strut rod to said movable connnecting member.

6. The combination with an automobile frame employing side members and having an axle associated therewith, of a resilient strut rod connected to said axle, a bracket connected to said frame, a movable element connected to said bracket and adapted to swing only in a vertical plane passed transversely through said frame, and means for pivotally connecting said strut rod to said movable element.

In testimony whereof, I have affixed my signature to this specification.

CHARLES H. JOCKMUS.